(12) United States Patent
Flynn et al.

(10) Patent No.: US 7,072,132 B2
(45) Date of Patent: *Jul. 4, 2006

(54) SYSTEM AND METHOD FOR WRITING SERVO TRACK IN SEALED HDD

(75) Inventors: David Flynn, Mantorville, MN (US); Gary Herbst, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 250 days.

This patent is subject to a terminal disclaimer.

(21) Appl. No.: 10/706,393

(22) Filed: Nov. 12, 2003

(65) Prior Publication Data

US 2005/0099717 A1 May 12, 2005

(51) Int. Cl.
*G11B 5/09* (2006.01)
(52) U.S. Cl. .......................................... 360/51; 360/39
(58) Field of Classification Search ................ 360/51, 360/60, 17, 75, 73.03, 78.06, 77.08, 39; 714/8
See application file for complete search history.

(56) References Cited

U.S. PATENT DOCUMENTS

| 5,448,429 | A | * | 9/1995 | Cribbs et al. ................. 360/75 |
| 5,771,131 | A | * | 6/1998 | Pirzadeh ................... 360/77.08 |
| 6,064,535 | A | * | 5/2000 | Wilson et al. ................. 360/60 |
| 6,078,452 | A | * | 6/2000 | Kittilson et al. ............... 360/51 |
| 6,154,331 | A |   | 11/2000 | Hanna .......................... 360/51 |
| 6,223,303 | B1 | * | 4/2001 | Billings et al. ................. 714/8 |
| 6,285,521 | B1 | * | 9/2001 | Hussein .................... 360/73.03 |
| 6,411,458 | B1 | * | 6/2002 | Billings et al. ............... 360/75 |
| 6,657,811 | B1 | * | 12/2003 | Codilian ................... 360/78.06 |
| 6,707,634 | B1 | * | 3/2004 | Kagami et al. ............... 360/75 |
| 6,714,371 | B1 | * | 3/2004 | Codilian ...................... 360/60 |
| 6,735,033 | B1 | * | 5/2004 | Codilian et al. .............. 360/60 |
| 6,738,205 | B1 | * | 5/2004 | Moran et al. ................. 360/17 |
| 6,785,075 | B1 | * | 8/2004 | Bryant et al. ................. 360/51 |
| 2002/0048107 | A1 |  | 4/2002 | Bryant et al. ................. 360/51 |
| 2002/0186494 | A1 |  | 12/2002 | Sugiyama et al. ............ 360/75 |

* cited by examiner

*Primary Examiner*—Fred F. Tzeng
(74) *Attorney, Agent, or Firm*—John L. Rogitz

(57) ABSTRACT

Write control bits are associated with servo pattern data bits to selectively disable or enable a write gate in a HDD write channel for self-servo writing after being sealed but before being vended to a user. The write gate can be disabled and enabled without deenergizing the write channel. A single write delay is calculated from one timing mark to the next to enable writing the next timing mark and portions of the radial pattern and servo pattern between the timing marks.

5 Claims, 4 Drawing Sheets

LOGIC

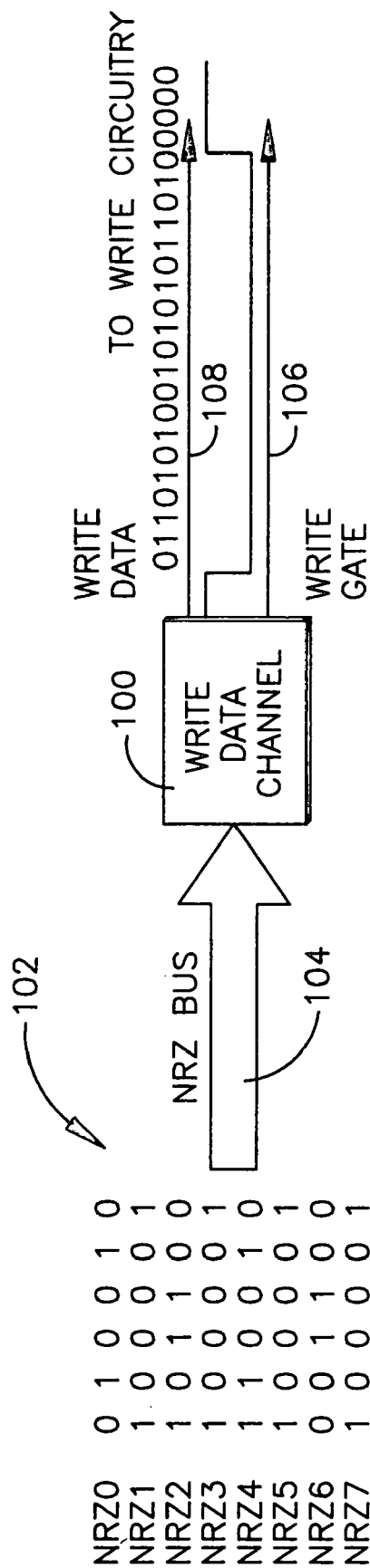
Fig. 5 ALTERNATE ENCODING

SYSTEM AND METHOD FOR WRITING SERVO TRACK IN SEALED HDD

FIELD OF THE INVENTION

The present invention relates to hard disk drives.

BACKGROUND OF THE INVENTION

During the manufacture of a hard disk drive (HDD) it is necessary to provide a magnetic pattern on each surface of each disk that is used by the servo control system for position and timing feedback. This pattern is known as the servo pattern. The process of writing this servo pattern onto each disk is known as servo writing. Typically the servo writing process is done in a cleanroom environment before the HDD is completely sealed, because during the servo writing process it is necessary to have very accurate position and timing feedback so that the servo pattern can be properly written across the entire surface of each disk in the HDD. The position feedback is typically provided by a special purpose positioner that comes in physical contact with the arms which support the heads on each surface of the HDD. The positioner provides the feedback and the ability to move the heads via the arms with sufficient accuracy. The timing feedback is provided by writing a pattern circumferentially around the disk with a dedicated head known as a clock head. It is inserted over one of the disks in the HDD for this purpose during the servo write process and then removed once the process is complete. The timing feedback has also been provided by writing timing signals with the heads in the HDD equally spaced around the circumference of at least one disk. The timing signals, called timing marks, need to be written each time the position of the heads is changed.

As recognized herein, it would be advantageous to servo-write a HDD without any external position or timing feedback to assist in the servo writing process, to allow the servo write process to be moved outside of the cleanroom after the HDD has been sealed. This provides a great cost advantage because cleanroom space is very expensive. Likewise, the present invention recognizes a need to make the above-discussed process more affordable by using the same electronics that are used on the finished product.

As understood herein, during the process of self-servo writing there are three basic patterns that must be written onto the disk. The first pattern is called a timing mark. Its purpose is to provide the timing or circumferential feedback for the self-servo write process. The second pattern is called the radial pattern. Its purpose is to provide the position or radial feedback for the self-servo write process. The third pattern is called the servo pattern. It is the pattern that will ultimately be used by the servo electronics in the HDD to provide timing and position feedback. The writing of the servo pattern is the main goal of the servo writing process. Both the timing marks and radial patterns are overwritten with customer data during the formatting of the HDD in subsequent processes.

The present critically recognizes that in existing HDD data channels, circuitry exists to recognize a timing mark and measure the time between two of them. The present invention further recognizes that this information can be used to calculate where the next three patterns (radial, servo and timing) should be written on the disk. The time to start the writing of these patterns may be controlled by a write delay that is provided to the data channel from a digital signal processor.

As recognized herein, however, the problem is that there are three patterns that must be written, which would otherwise require the generation of three write delays. Moreover, many types of servo patterns require some fields within the pattern to not be written at all, further complicating the task by requiring the write circuitry to be energized and deenergized repeatedly, a process that entails delays in component warm-up, etc. Therefore, without the present invention the write process must be turned off and started up again in the middle of a write between timing marks, requiring the provision of additional write delays to the channel.

With this in mind, the present invention critically recognizes that in typical HDD electronics the data channel is the primary source of position and timing feedback, and that it possesses sufficient accuracy for the servo writing process.

SUMMARY OF THE INVENTION

The present invention improves the flexibility of writing patterns on the disks during the servo write process without adding complexity to the process. The feature can be implemented in the data channel integrated circuit which could be used for self-servo write. The present invention involves the control of the write gate by encoding whether it is active or inactive in the data that is being passed to the data channel over the NRZ bus, greatly simplifying the ability to start and stop the writing process which is necessary during the servo write process.

Accordingly, a hard disk drive (HDD) includes a write channel including a write gate and control circuitry controlling the write gate using write control bits to selectively enable writing data bits associated with a servo pattern onto at least one disk. In a preferred embodiment, the control circuitry writes a servo pattern after the HDD has been sealed. The write channel advantageously may be used during operation to write user data to the disk.

In one implementation, the control circuitry uses two bits of a ten bit parallel bus as write control bits to indicate whether the write gate should enable writing one or more of the remaining eight bits of the bus to disk. In another implementation, the control circuitry uses four bits of an eight bit parallel bus as write control bits to indicate whether the write gate should enable writing one or more of the remaining four bits of the bus to disk.

As set forth in greater detail below, the preferred control circuitry uses a write delay to a next timing mark that is based on detecting a current timing mark. The time delay includes a clock cycle component and a clock phase component, and the write channel uses the write delay to write the next timing mark and associated portions of the servo pattern to disk.

In another aspect, a method for self-servo writing a servo pattern to a disk using a write channel intended for subsequently writing user data includes receiving a servo pattern defined by a stream of data bits, and based on write control bits associated with the servo pattern, enabling and disabling a write gate associated with the write channel without deenergizing the write channel.

In still another aspect, a system includes a hard disk drive controller, and a disk onto which the controller writes user data using at least one write channel, with the write channel including a write gate. Means are provided for, at least prior to providing the system to the user, selectively enabling and disabling the write gate while the write channel remains energized to write a servo pattern on the disk.

In yet another aspect, a HDD includes a write channel configured for writing user data to a disk and control circuitry using the write channel to write timing marks and a portion of a servo pattern using a single write delay determined using a prior timing mark.

The details of the present invention, both as to its structure and operation, can best be understood in reference to the accompanying drawings, in which like reference numerals refer to like parts, and in which:

BRIEF DESCRIPTION OF THE DRAWINGS

FIG. 5 is a schematic diagram of another servo mode circuit that uses four bits of an eight bit parallel bus for write gate control and the remaining four bits for data.

DETAILED DESCRIPTION OF THE PREFERRED EMBODIMENT

Figure 1:
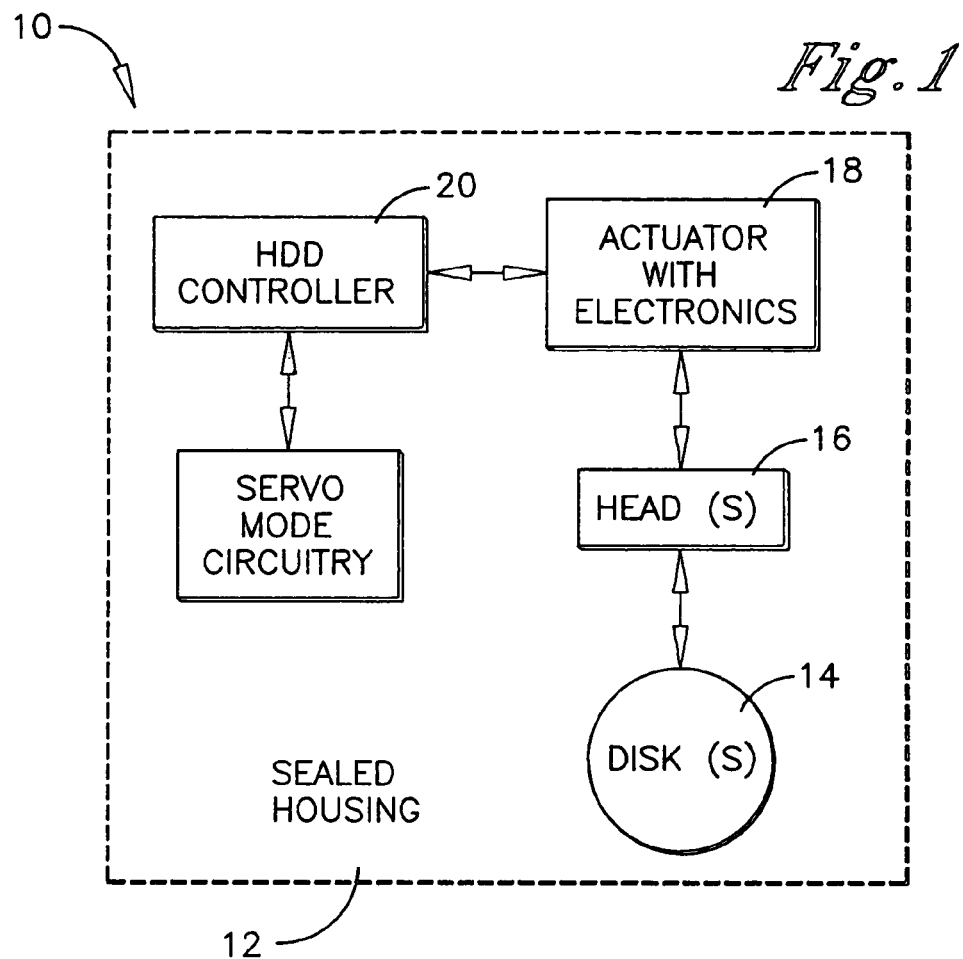
FIG. 1 is a block diagram of the present hard disk drive (HDD)

Referring initially to FIG. 1, a hard disk drive (HDD) is shown, generally designated 10, which includes a sealed housing 12 that holds one or more data storage disks 14 that can be read or written to by one or more read/write heads 16. The heads 16 are mounted on an actuator 18 that may include electronic circuits, with the actuator 18 being controlled in turn by a HDD controller 20.

The logic disclosed below may be contained in the HDD controller 20. Or, it may be contained in the actuator 18, or on chipsets that are separate from the controller 20 and actuator 18. The logic may be distributed through the components mentioned above, and may be implemented in hardware logic circuits and/or software logic circuits. For example, the logic for encoding write control bits in the servo pattern data stream may be implemented by one component, while the logic for using the write control bits to enable and disable the write gate may be contained in another component.

Figure 2:
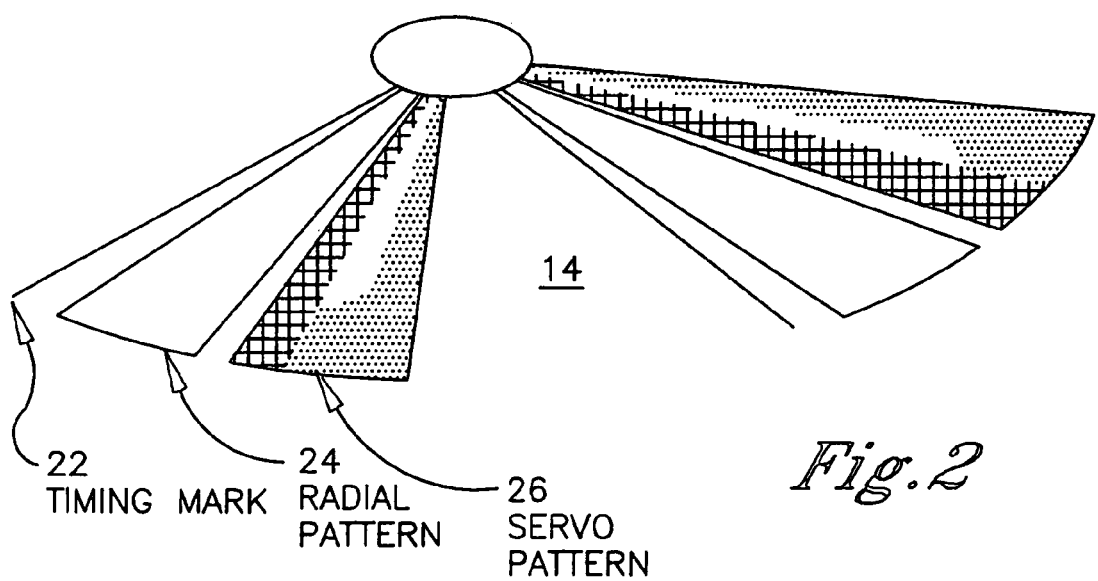
FIG. 2 is a schematic diagram of a portion of a disk, showing the timing marks, radial pattern, and servo pattern.

For illustration, FIG. 2 shows a portion of a disk 14 that is written to have certain control patterns in accordance with the disclosure below, after the housing 12 has been sealed and not requiring the HDD 10 to be placed in a clean room for writing. That is, the HDD 10 employs the logic below for self-servo writing. In accordance with principles known in the art, the control patterns include timing marks 22, a radial pattern 24, and a servo pattern 26. Both the radial pattern 24 and servo pattern 26 are keyed to the timing marks 22. Accordingly, once the location of a timing mark is determined, the portions of the radial pattern 24 and servo pattern 26 that exist between the timing mark and the next successive timing mark are also known, and the spacing between the start of each pattern portion may be expressed in terms of clock cycles.

Figure 3:
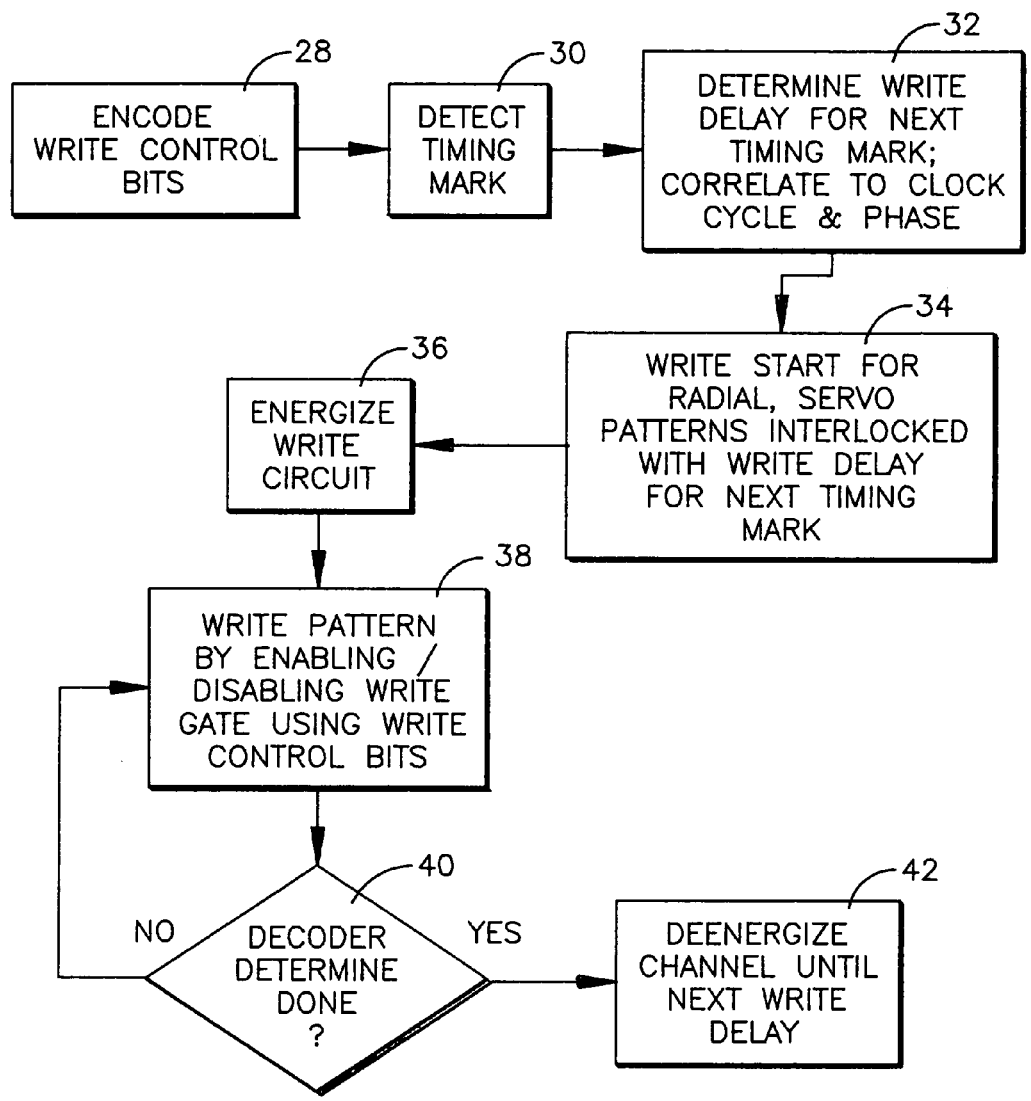
FIG. 3 is a flow chart of the present logic.

Now referring to the logic flow chart of FIG. 3, commencing at block 28 write control bits are encoded into a data stream representing the servo pattern. Similarly, write control bits may be encoded into a data stream representing the radial pattern. For instance, write control bit values of, e.g., zero for a portion of a servo pattern between timing marks may be generated to disable the write gate in accordance with disclosure below while the write channel remains energized between writing a timing mark and starting the write of the servo pattern portion associated with that mark. The time period between a timing mark and the portion of the servo pattern associated with that timing mark typically is known constant period of time, so that all that needs to be done is the encoding of write control bit values of zero for the time period from a timing mark detection to the start of the write of the servo pattern.

Also, once servo pattern writing commences, when it happens that certain fields within the servo pattern are not to be written for a particular portion, write control bit values of zero are generated to disable the write gate for those fields while the write channel remains energized. On the other hand, the write control bit values associated with servo pattern data that is to be written to disk are encoded to have a value of one to enable the write gate. Of course, the opposite convention can be used, i.e., write control bit values of zero can enable the gate and values of one can disable the gate, in the case of, e.g., negative active write gates. In any case, by knowing the servo pattern, write control bits are encoded simply by associating write control bit values of one to servo pattern data bits that are to be written, and by associating write control bit values of zero otherwise. As set forth further below, a single write control bit may be associated with a single servo pattern data bit or with more than one servo pattern data bit.

For the first iteration, an initial timing mark is written in accordance with servo writing principles known in the art. Then proceeding to block 30 for each timing mark thereafter, a previously written timing mark is detected on the disk. Moving to block 32, a write delay is determined for the next timing mark to be written. This write delay is a time delay preferably expressed in terms of a coarse component of clock cycle and a fine component of cycle phase. For example, the coarse component might specify writing the timing mark in the $N^{th}$ clock cycle following the existing timing mark, while the fine component specifies precisely where in the 360° cycle of the $N^{th}$ clock cycle to write the next timing mark. The present invention recognizes that this is possible owing to the typically high resolution of write channels, which access precise clocking signals that can provide precise cycle and phase information.

In determining the write delay for the next timing mark, timing principles known in the art may be used. For example, if the temporal distance between timing marks should be one hundred microseconds and the processing circuitry notices that the previous two timing marks were temporally spaced a somewhat lesser amount due to, e.g., spindle or disk speed variation or mechanical vibration or some other reason, the write delay to the next timing mark might be lengthened to an equivalent amount over one hundred microseconds.

Block 34 indicates that once the write delay to the next timing mark is determined, the times for starting the writing of the radial pattern portion and servo pattern portion between the detected timing mark and the next calculated timing mark are defined, since these times are interlocked to those of the timing marks. Accordingly, separate write delays for the radial pattern portion and servo pattern portion between the detected timing mark and the next calculated timing mark need not be determined from scratch, requiring only a single write delay be calculated from timing mark to timing mark. As mentioned above, the known period from a timing mark to when the associated portion of the servo pattern is to be written can be established by encoding the appropriate number of write control bit values of zero.

At block 36, the write channel or circuit is energized, based on the write delay determined above, to write the timing mark and subsequent portions of the radial and servo patterns. From one timing mark to the next, these patterns are written at block 38 by enabling and disabling the write gate of the write channel in accordance with the write control bit encoding discussed further below. At decision diamond 40 it is determined by, e.g., a decoder whether the servo pattern portion has been written, and if so the write channel may be deenergized at block 42 until the next timing mark is detected, at which point the logic loops back to block 32.

Figure 4:
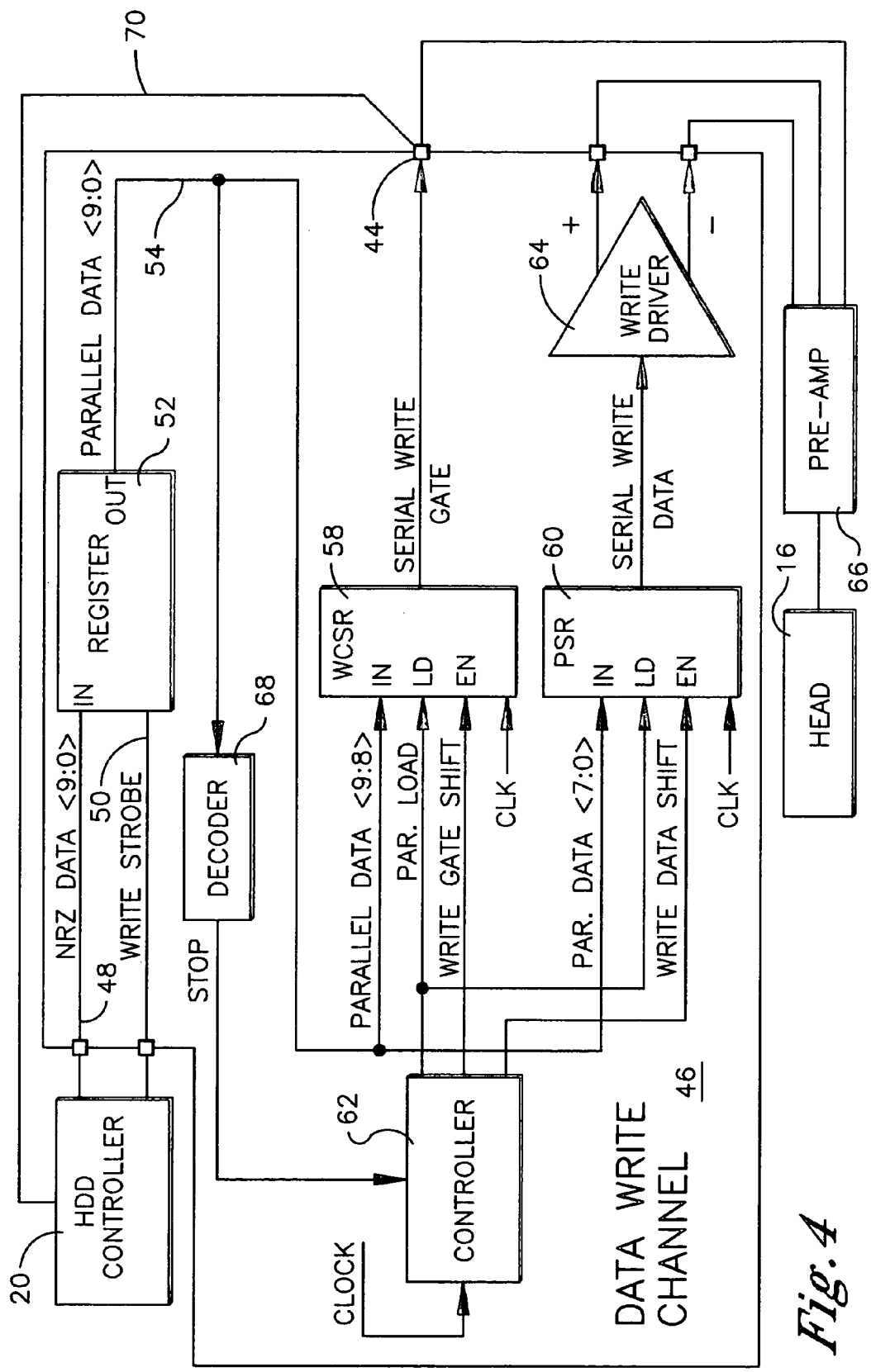
FIG. 4 is a block diagram of one preferred servo mode circuitry that uses two bits of a ten bit parallel bus for write gate control and the remaining eight bits for data.

FIG. 4 shows a preferred non-limiting circuit that can be used to enable and disable a write gate 44 of a write channel 46. While not all the circuitry shown in FIG. 4 is used to write user data after servo pattern writing, the write channel proper can subsequently be used to write user data once servo writing is completed. Data is received from, e.g., the HDD controller 20. In a preferred implementation the data is received from a ten bit parallel bus such as the Non-Return to Zero (NRZ) bus 48. A write strobe can also be provided on a line 50 to clock the data over the NRZ bus. The parallel data is received by a register 52, which outputs the parallel data on a parallel write bus 54. Two of the ten bits, denoted bits "9" and "8" in FIG. 4, are write control bits that have been encoded as described above and that are sent to a write control shift register (WCSR) 56, while the remaining eight bits, which are, e.g., servo pattern data bits, are sent to a pattern shift register (PSR) 60. The first write control bit "9" may be associated with the last four data bits "4"–"7" to enable or disable the write gate 44 as appropriate to write the bits or not, while the second write control bit "8" may be associated with the first four data bits "0"–"3".

As also shown in FIG. 4, a controller 62 receives a clock signal and outputs a parallel load signal to the shift registers 58, 60 in accordance with write channel principles known in the art. The controller 62 also sends a write gate shift signal to the WCSR 58 and a write data shift signal to the PSR 60. Both shift registers 58, 60 also receive clocking signals as shown.

The WCSR 58 outputs a serial write gate signal to the write gate 44, enabling or disabling the write gate 44 when the current write control bit value sent to the write gate 44 is one or zero, respectively. On the other hand, the PSR 60 sends a serial write data stream to a write driver 64. The write gate 44 is connected to a preamplifier 66, and the write driver 64 sends positive and negative data signals to the preamplifier 66. When the write gate 44 is enabled, the preamplifier causes the stream of servo pattern data received from the write driver 64 to be written by the heads 16 to the disk. In contrast, when the write gate 44 is disabled, the stream of pattern data still flows through the write channel but is not written by the heads 16 as might be the case when, for example, a particular field of the servo pattern is not to be written. The write channel 46 remains energized, however, such that as soon as the write gate 44 is reenabled by the write control bits the servo pattern data flowing through the write channel 46 is immediately written to disk without the overhead of warmup and propagation delay in the write channel.

It may now be appreciated that the write channel 46 requires no external write gate for servo self-write. Instead, the conventional write gate 44 is used. It may be further appreciated that during servo pattern writing, the write channel 46 knows when to start writing based on the write delay calculated above, but it does not know how much data to write. It simply continues to write until the write gate 44 is disabled.

A decoder element 68 may be provided to receive input from the parallel write bus 54 that indicates when the pattern writing associated with the present timing mark is complete. When it is, the decoder element provides a stop signal to the controller 62, which may be used if desired to deenergize the write channel 46 until the next timing mark is detected. As shown by the line 70, the HDD controller 20 is also directly connected to the write gate 44 to control the write gate 44 during subsequent operations after servo pattern writing when user data is to be written to the disk. The above-described WCSR 58 after servo pattern writing may no longer be used.

FIG. 5 shows an alternate write channel 100 that receives eight bits 102 (designated NRZ0-NRZ7 in FIG. 5) from a parallel data NRZ bus 104. In the embodiment shown in FIG. 5, the odd numbered bits are data bits and the even numbered bits are write control bits that enable or disable a write gate 106 in accordance with principles set forth above for the immediately succeeding odd numbered bit. That is, bit NRZ0 is a write control bit the value of which enables or disables the write gate 106 for the data bit NRZ1, and so on, with one and only one write control bit thus being associated with one and only one data bit. The encoding of the write control bits is undertaken in accordance with principles discussed previously. The serial data on line 108 illustrates the data stream that is output to the write circuitry.

The present invention accordingly provides the write control information along with the data to be written as it is passed to the channel through the NRZ bus. The write channel 100 interprets the state of each write control bit and drives the write gate 106 accordingly as the associated bit is provided to the write circuitry. As mentioned above, this feature is activated only during the servo write process.

The benefit of this feature is it allows the three patterns to be written with fewer write delays. Each write delay has to be calculated and passed to the data channel before the write process can occur. This has to be done after each timing mark is detected and the interval between consecutive timing marks is known. By reducing the number of write delays the amount of calculations by the digital signal processor is reduced. It also reduces the amount of time where information needs to be passed to the data channel to prepare for the next pattern that is to be written. In the future the number of servo patterns on each track is predicted to increase. As the number of servo patterns that are required for each track increases the time between them reduces during the servo write process, rendering it even more important to reduce the amount of time necessary to set-up the data channel for each write.

Another benefit of the present invention is it allows for precise control of which bits are written to the disk. It also eliminates the effects of any delays in the data channel itself by synchronizing the write gate with the associated serialized bits. If necessary it can even be used to activate the write gate early to allow for the warm-up associated with the write circuitry that drives the inductive head element. The present invention thus allows maximum flexibility in writing patterns during the self-servo write process without any additional overhead in setting up the channel for the writing process.

While the particular SYSTEM AND METHOD FOR WRITING SERVO TRACK IN SEALED HDD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A HDD comprising:
    at least one write channel including at least one write gate; and
    control circuitry controlling the write gate using write control bits to selectively enable writing data bits associated with a servo pattern onto at least one disk, wherein the control circuitry uses tow bits of a ten bit parallel bus as write control bits to indicate whether the write gate should enable writing one or more of the remaining eight bits of the bus to disk.

2. The HDD of claim 1, wherein the control circuitry writes a servo pattern after the HDD has been sealed.

3. The HDD of claim 1, wherein the write channel is used during operation to write user data to the disk.

4. The HDD of claim 3, wherein the control circuitry uses a write delay to a next timing mark based on detecting a current timing mark, the time delay including a clock cycle component and a clock phase component, the write channel using the write delay to write the next timing mark and associated portions of the servo pattern to disk.

5. A HDD comprising:
    at least one write channel including at least one write gate; and
    control circuitry controlling the write gate using write control bits to selectively enable writing data bits associated with a servo pattern onto at least one disk, wherein the control circuitry uses four bits of an eight bit parallel bus as write control bits to indicate whether the write gate should enable writing one or more of the remaining four bits of the bus to disk.

* * * * *

UNITED STATES PATENT AND TRADEMARK OFFICE
CERTIFICATE OF CORRECTION

PATENT NO. : 7,072,132 B2 Page 1 of 1
APPLICATION NO. : 10/706393
DATED : July 4, 2006
INVENTOR(S) : Flynn et al.

It is certified that error appears in the above-identified patent and that said Letters Patent is hereby corrected as shown below:

Col. 8, line 2, "tow" should read --two--.

Signed and Sealed this

Twelfth Day of September, 2006

JON W. DUDAS
*Director of the United States Patent and Trademark Office*